United States Patent
Elbe et al.

(10) Patent No.: US 7,831,650 B2
(45) Date of Patent: *Nov. 9, 2010

(54) METHOD FOR MODULAR MULTIPLICATION

(75) Inventors: Astrid Elbe, München (DE); Holger Sedlak, Sauerlach (DE); Norbert Janssen, München (DE); Jean-Pierre Seifert, München (DE)

(73) Assignee: Infineon Technologies AG (DE)

( * ) Notice: Subject to any disclaimer, the term of this patent is extended or adjusted under 35 U.S.C. 154(b) by 1203 days.

This patent is subject to a terminal disclaimer.

(21) Appl. No.: 11/440,725

(22) Filed: May 25, 2006

(65) Prior Publication Data

US 2007/0185948 A1    Aug. 9, 2007

Related U.S. Application Data

(60) Division of application No. 10/662,627, filed on Sep. 15, 2003, now Pat. No. 7,120,660, which is a continuation of application No. PCT/EP02/00734, filed on Jan. 24, 2002.

(30) Foreign Application Priority Data

Mar. 13, 2001 (DE) ................................ 101 11 987

(51) Int. Cl.
    *G06F 7/38*       (2006.01)
(52) U.S. Cl. ..................................................... 708/491
(58) Field of Classification Search .......... 708/491–492
    See application file for complete search history.

(56) References Cited

U.S. PATENT DOCUMENTS

| 4,870,681 A | 9/1989 | Sedlak |
| 6,917,956 B2 | 7/2005 | Rarick |

FOREIGN PATENT DOCUMENTS

| DE | 36 31 992 C2 | 11/1987 |
| WO | WO 99/14880 | 3/1999 |

OTHER PUBLICATIONS

Walter C. D.: "Faster Modular Multiplication by Operand Scaling", Editor: Feigenbaum, J.: "Advances in Cryptology-CRYPTO '91", Springer Verlag, Aug. 1991, pp. 1991, pp. 313-323.
Walter, C. D.: "Space/Time Trade-Offs for Higher Radix Modular Multiplication Using Repeated Addition", IEEE, vol. 46, No. 2, Feb. 1997, pp. 139-141.

*Primary Examiner*—Tan V Mai
(74) *Attorney, Agent, or Firm*—Dickstein Shapiro LLP

(57) ABSTRACT

In a method for modular multiplication using a multiplication look-ahead process for computing a multiplication shift value and a reduction look-ahead process for computing a reduction shift value, a modulus is first transformed into a transformed modulus that is greater than said modulus. The transformation is carried out such that a predetermined fraction of the transformed modulus has a higher-order digit with a first predetermined value that is followed by at least one low-order digit having a second predetermined value. During the iterative working off of the modular multiplication using the multiplication look-ahead process and the reduction look-ahead process, the transformed modulus is utilized so as to obtain at the end of the iteration a transformed result for the modular multiplication. Finally, the transformed result is re-transformed by modular reduction using the original modulus. By means of the transformation according to the invention, iterative working off of the modular multiplication is simplified so that the modular multiplication can be performed faster.

9 Claims, 7 Drawing Sheets

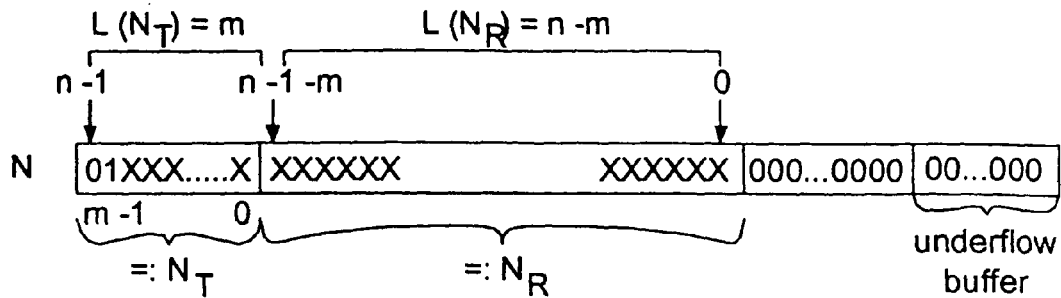
FIG 2
(Modulus)
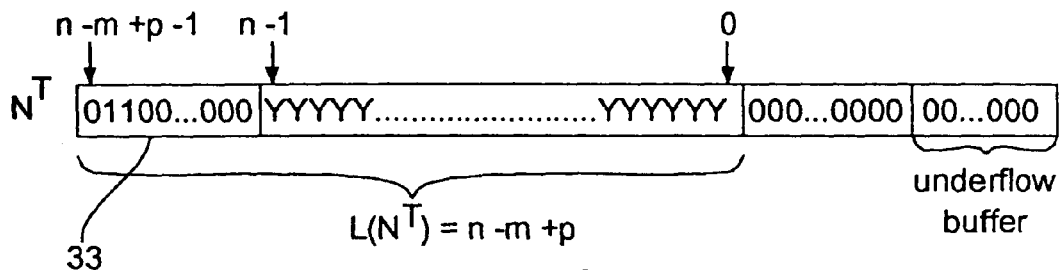
FIG 3
(Transformed modulus)
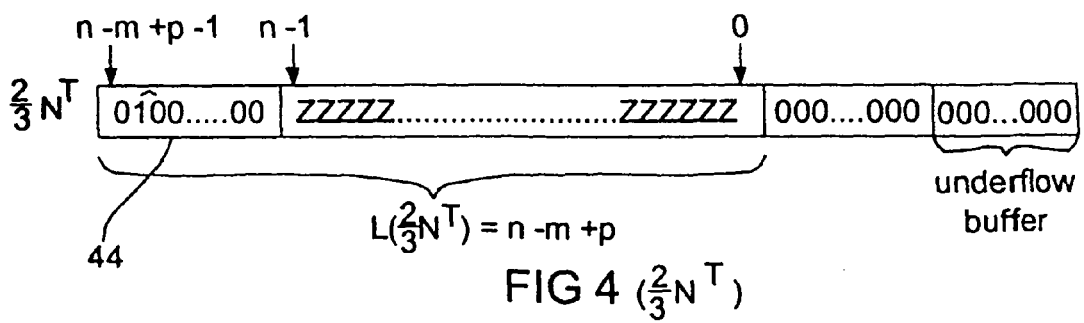
FIG 4 ($\frac{2}{3}N^T$)

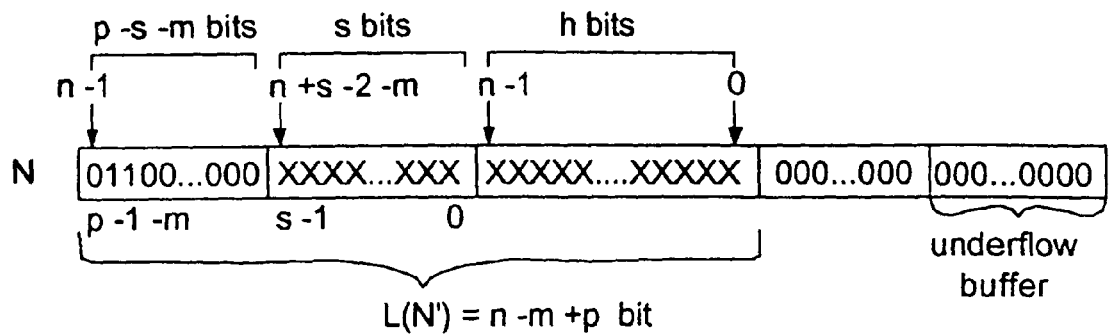
FIG 5 (Transformed modulus with randomization)
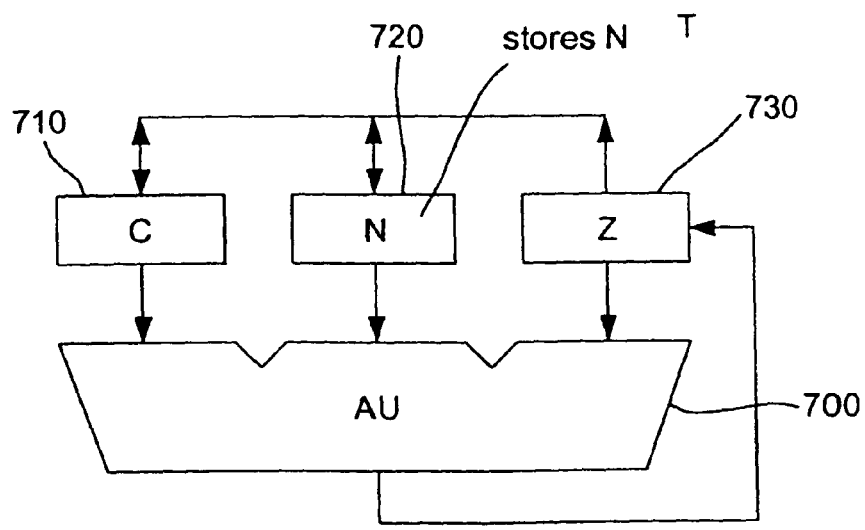
FIG 6

METHOD FOR MODULAR MULTIPLICATION

CROSS-REFERENCE TO RELATED APPLICATIONS

This is a divisional application of application Ser. No. 10/662,627, filed Sep. 15, 2003; which was a continuation of international application No. PCT/EP2002/00734, filed Jan. 24, 2002; the application also claims the priority, under 35 U.S.C. §119, of German application DE 101 11 987.9, filed Mar. 13, 2001. The prior applications are herewith incorporated by reference in their entirety.

BACKGROUND OF THE INVENTION

1. Field of the Invention

The present invention relates to cryptographic algorithms and apparatus for implementing such cryptographic algorithms, and in particular to a method for modular multiplication using a multiplication look-ahead process and a reduction look-ahead process.

2. Description of the Related Art

Cryptography is one of the essential applications of modular arithmetic. An essential algorithm for cryptography is the known RSA algorithm. The RSA algorithm is based on a modular exponentiation that can be represented as follows:

$$C = M^d \mod(N),$$

wherein C is an encrypted message, M is a non-encrypted message, d is the secret key and N is the modulus. Modulus N usually is generated by multiplication of two prime numbers p and q. The modular exponentiation is broken down into multiplications by means of the known square-and-multiply algorithm. To this end, the exponent d is broken down into powers of two so that the modular exponentiation may be broken down into several modular multiplications. For being able to efficiently implement the modular exponentiation in terms of computation, the modular exponentiation thus is broken down into modular multiplications, which may then be broken down into modular additions.

The document DE 3631992 C2 discloses a cryptographic process in which the modular multiplication can be accelerated using a multiplication look-ahead process and a reduction look-ahead process. The process described in DE 3631992 C2 is also referred to as ZDN method and will be explained in more detail by way of FIG. 9. After a start step 900 of the algorithm, the global variables M, C and N are initialized. The object consists in computing the following modular multiplication:

$$Z = M^*C \mod N.$$

M is the multiplier, whereas C is the multiplicand. Z is the result of the modular multiplication, whereas N is the modulus.

Then, there are various local variables initialized that need not be dealt with in more detail for the time being. Thereafter, two look-ahead processes are employed. In the multiplication look-ahead process GEN_MULT_LA, a multiplication shift value $s_z$ as well as a multiplication look-ahead parameter a are calculated (910) employing various look-ahead rules. Following this, the current contents of the Z register are subjected to a left-shift operation by $s_z$ digits (920).

Substantially parallel therewith, there is carried out a reduction look-ahead process GEN_Mod_LA (930) for calculating a reduction shift value $S_N$ and a reduction parameter b. In a step 940, the current content of the modulus register, i.e. N, is shifted by $S_N$ digits to the left or to the right, respectively, in order to produce a shifted modulus value N'. The central three-operand operation of the ZDN method takes place in a step 950. In this step, the intermediate result Z' after step 920 is added to the multiplicand C that has been multiplied by the multiplication look-ahead parameter a, and to the shifted modulus N' that as been multiplied by the reduction look-ahead parameter b. Depending on the current situation, the look-ahead parameters a and b may have a value of +1, 0 or −1.

A typical case is that the multiplication look-ahead parameter a is +1 and that the reduction look-ahead parameter b is −1, so that the multiplicand C is added to a shifted intermediate result Z', and the shifted modulus N' is subtracted therefrom. a will have a value of 0 if the multiplication look-ahead process would allow more than a preset number of individual left-shifts, i.e. if $s_z$ is greater than the maximum admissible value of $s_z$, which is also referred to as k. In the event that a is 0 and that Z', due to the preceding modular reduction, i.e. the preceding subtraction of the shifted modulus, still is quite small, in particular smaller than the shifted modulus N', no reduction has to take place to that the parameter b is 0.

Steps 910 to 950 are carried out until all digits of the multiplicand have been worked off or processed, i.e. until m is 0 and also until a parameter n is 0; this parameter indicates whether the shifted modulus N' still is greater than the original modulus N or whether, despite the fact that all digits of the multiplicand have already been worked off, still further reduction steps have to be carried out by subtraction of the modulus from Z.

Finally, it is determined whether Z is smaller than 0. If this is the case, it is necessary for achieving a final reduction that modulus N be added to Z so that the correct result Z of the modular multiplication is obtained in the end. In a step 960, the modular multiplication by way of the ZDN method is concluded.

The multiplication shift value $s_z$ as well as the multiplication parameter a that are calculated in step 910 by the multiplication look-ahead algorithm, result from the topology of the multiplier as well as by the look-ahead rules employed which are described in DE 3631992 C2.

The reduction shift value $S_N$ as well as the reduction parameter b, as described in DE 3631992 C2 as well, are determined by way of a comparison of the current contents of the Z register with a value ⅔ times N. This comparison gives the ZDN method its name (ZDN=Zwei Drittel N (=two thirds N)).

The ZDN method as illustrated in FIG. 9 returns the modular multiplication to a three-operand addition (block 950 in FIG. 9), in which the multiplication look-ahead process and, concomitantly therewith, the reduction look-ahead process, are employed for increasing computing time efficiency. Thus, an advantage in terms of computing time can be achieved in comparison with the Montgomery reduction.

In the following, the reduction look-ahead process performed in block 930 of FIG. 9 will be discussed in more detail by way of FIG. 10. Firstly, in a block 1000, a reservation is carried out for the local variables, i.e. the reduction look-ahead parameter b and the reduction shift value $S_N$. In a block 1010, the reduction shift value SN is initialized to zero. Then, the value ZDN is calculated in a block 1020, which is equal to ⅔ of modulus N. This value determined in block 1020 is stored in a register of its own, namely the ZDN register, in the crypto coprocessor.

It is then determined in a block 1030 whether the variable n is 0 or whether the shift value $S_N$ is −k. k is a value that defines the maximum shift value preset by the hardware. In the first pass, block 1030 is answered NO such that in a block 1040, parameter n is decremented and that in a block 1060, the reduction shift value is decremented by 1 as well. In a block 1080, the variable ZDN then is allocated anew, namely with half of its value, which may easily by achieved by a right-shift of the value contained in the ZDN register. It is then determined in a block 1100 whether the absolute value of the current intermediate result is greater than the value contained in the ZDN register.

This comparison operation in block 1100 is the central operation of the reduction look-ahead process. If the question is answered YES, the iteration is terminated, and the reduction look-ahead parameter b will be allocated as shown in block 1120. If, in contrast thereto, the question to be answered in block 1100 is answered NO, the iteration jumps back in order to examine the current values of n and $S_N$ in block 1030. If block 1030 is answered YES at any time in the iteration, the sequence jumps back to a block 1140 in which the reduction parameter b is set to zero. In the three-operand operation illustrated in block 950, this has the effect that no modulus is added or subtracted, which means that the intermediate result Z was so small that no modular reduction was necessary. In a block 1160, the variable n then is allocated anew, and in a block 1180 finally the reduction shift value $S_N$ is computed which is required in a block 940 of FIG. 9 in order to perform the left-shift of the modulus so as to obtain a shifted modulus.

In blocks 1200, 1220 and 1240, the current values of n and k are finally examined with respect to further variables MAX and cur_k for examining the current allocation of the N register, in order to make sure that no register exceeding takes place. The closer details are not relevant to the present invention, but are described in detailed manner in DE 3631992 C2.

The algorithm shown in FIGS. 9 and 10 can be implemented in terms of hardware as illustrated in FIG. 7. For the three-operand operation to be carried out in block 950, there is required an arithmetic unit 700, designated AU in FIG. 7. The latter is coupled with a register C 710 for the multiplicand, a register N 720 for the modulus and a register Z 730 for the current intermediate result of the modular multiplication. FIG. 7 reveals furthermore that the result of the three-operand operation, via a feedback arrow 740, is fed back to Z register 730. FIG. 7 illustrates furthermore the mutual connection of the registers. The value ZDN computed in block 1020 of FIG. 10 has to be stored in a ZDN register 750 of its own. The ZDN comparison, i.e. the iteration loop shown in FIG. 10, furthermore is controlled in its progress by a control logic 760 for the ZDN comparison of its own.

The main work of the ZDN algorithm for computing Z:=M×C mod N thus consists in the following two operations:

1. Computing the shift values $s_z$ and $s_i$ for the registers Z and N so as to fulfill the following equation:

$$\tfrac{2}{3}N \times 2^{-si} < |Z| \leq \tfrac{4}{3}N \times 2^{-si} \text{ and}$$

2. Computing the three-operand sum:

$$Z := 2^{sZ}Z + aC + b \times 2^{sz-si}N,$$

The multiplication look-ahead parameter a and the reduction look-ahead parameter b may assume values of −1, 0 and +1, as is known.

It is to be pointed out that the intermediate result Z, the multiplicand C and the modulus N are long numbers, i.e. numbers whose count of digits or bits may indeed be greater than 512, and which may also have up to more than 2048 digits.

The comparison of the current intermediate result Z with the value ZDN, which is to be carried out in block 1100, however, is not carried out for all bits of Z for reasons of computation time, but only with a number of most significant bits of Z; in this respect, a number of 32 bits has turned out to be sufficient for obtaining very high accuracy for the comparison result.

For the 32 most significant bits of ⅔ N required for this comparison, a register of its own is necessary which in FIG. 7 is indicated under reference numeral 750 and which is referred to as ZDN register.

Furthermore, a hardware comparator of its own is necessary which computes for the current value in the Z register and for the current value in the ZDN register the correct $s_i$ value so that the following equation is fulfilled:

$$\tfrac{2}{3} 2^{-si} N < |Z| \leq \tfrac{4}{3} 2^{-si} N$$

Thus, what is disadvantageous in this method is on the one hand that both the additional ZDN register and the hardware comparator require extra chip area. On the other hand, the computation of ⅔ N and the computation of the auxiliary shift value $s_i$ in the ZDN algorithm performed by the iteration loop shown in FIG. 10 are time-critical for the entire algorithm and may indeed be determinative for the overall execution time of the algorithm.

SUMMARY OF THE INVENTION

It is the object of the present invention to provide an improved concept for modular multiplication, which on the one hand can be implemented in more space-saving manner and on the other hand requires less computation time.

In accordance with a first aspect of the invention this object is achieved by a method of modular multiplication of a multiplicand (C) by a multiplier (M), in which a modulus (N) is employed, making use of a multiplication look-ahead process and a reduction look-ahead process, said method comprising the steps of:

transforming (10) the modulus (N) into a transformed modulus ($N^T$) that is greater than the modulus (N), with a predetermined fraction (⅔) of the transformed modulus having a higher-order digit with a first predetermined value that is followed by at least one lower-order digit having a second predetermined value;

iterative working off (12) of the modular multiplication making use of the multiplication look-ahead process and the reduction look-ahead process and utilizing the transformed modulus ($N^T$) so as to obtain at the end of the iteration a transformed result for the modular multiplication; and re-transforming (14) the transformed result by modular reduction of the transformed result utilizing the modulus (N).

In accordance with a second aspect of the invention, this object is achieved by a processor for modular multiplication of a multiplicand by a multiplier, in which a modulus is employed, making use of a multiplication look-ahead process and a reduction look-ahead process, comprising:

a means for transforming the modulus into a transformed modulus that is greater than the modulus, with a predetermined fraction of the transformed modulus having a higher-order digit with a first predetermined value that is followed by at least one lower-order digit having a second predetermined value;

a means for iterative working off the modular multiplication making use of the multiplication look-ahead process and the reduction look-ahead process and utilizing the transformed modulus so as to obtain at the end of the iteration a transformed result for the modular multiplication; and a means for retransforming the transformed result by modular reduction of the transformed result utilizing the modulus.

The present invention is based on the finding that the comparison of the updated intermediate result with the value ZDN, i.e. ⅔ times modulus N, which comparison involves high expenditure in computation time, can be facilitated when the modulus N is first transformed into a transformed modulus $N^T$ and the entire modular multiplication is carried out with the transformed modulus $N_T$ instead of the modulus proper. According to the invention, the modulus is transformed such that the predetermined fraction of the transformed modulus, i.e. in a preferred embodiment, ⅔ times the transformed modulus, becomes a specific number that is selected such that the comparison of ⅔ $N^T$ with the intermediate result Z becomes trivial. According to the present invention, the transformation is carried out such that the predetermined fraction of the transformed modulus has a higher-order digit with a first predetermined value, which is followed by at least one low-order digit having a second predetermined value. In binary representation and two's complement convention in which the most significant bit indicates the sign, the transformation of the modulus into a transformed modulus is carried out such that the second-most-significant bit of ⅔ $N^T$ is a binary one, whereas the third-most-significant bit and still further less significant bits are zeroes.

In this event, the comparison is trivial such that it is simply necessary to count the number of the digits between the most significant one of the predetermined fraction of the transformed modulus and the updated intermediate result Z of the modular representation in order to obtain the shift value $s_i$ from which the reduction shift value $S_N$ can then be determined simply by subtracting the so-called auxiliary shift value $s_i$ obtained by the ZDN comparison from the multiplication shift value of the multiplication look-ahead process taking place parallel thereto.

The entire ZDN operation is worked off exactly as in case of the prior art. However, instead of the modulus N, the transformed modulus $N^T$ is employed, so that finally a "transformation result" of the modular multiplication is achieved which is in the remainder class of the transformed modulus $N^T$. A final retransformation such that the transformation result of the modular multiplication is reduced in modular manner, making use of the original modulus N, will then yield the result proper of the modular multiplication of the multiplier M by the multiplicand C using modulus N.

Other features which are considered as characteristic for the invention are set forth in the appended claims.

Although the invention is illustrated and described herein as embodied in "Method for Modular Multiplication", it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 shows the splitting of a modulus N into a first section $N^T$ of bits and into a second section $N^R$ of bits;

FIG. 3 shows the splitting of the transformed modulus $N^T$ into a first section of digits having a length L ($N^T$) and the remaining digits;

FIG. 4 shows a representation of the digits of ⅔ times the transformed modulus $N^T$;

FIG. 5 shows a schematic representation of the digits of the transformed modulus with randomization;

FIG. 6 shows a schematic representation of an arithmetic-logic unit for performing the modular multiplication according to the present invention;

DESCRIPTION OF THE PREFERRED EMBODIMENTS

Figure 1:
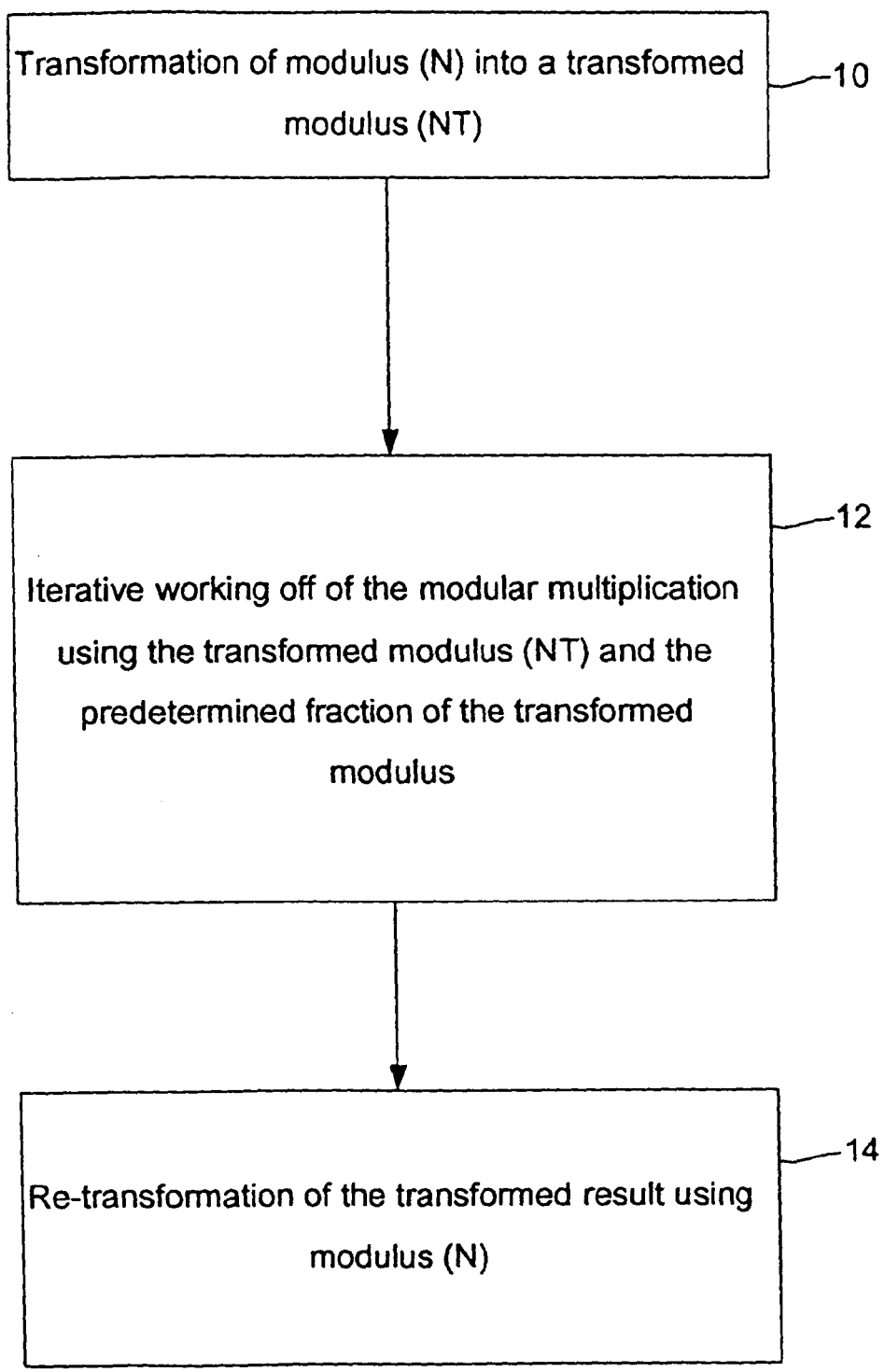
FIG. 1 shows a flow chart of the concept for modular multiplication according to the invention.

FIG. 1 shows a flow chart of the method according to the invention for modular multiplication of a multiplicand C by a multiplier M using a modulus N. At first, the modulus N is transformed, in a step 10, into a transformed modulus $N^T$ in accordance with the following equation:

$$N^T = T \times N.$$

In a step 12, the modular multiplication is then worked off using the transformed modulus $N^T$ and the predetermined fraction of the transformed modulus which is ⅔ in the preferred embodiment. With respect to a modular exponentiation, this means that an RSA equation of the following form is computed:

$$C^T := M^d \bmod N^T.$$

Thus, the result of the modular exponentiation C is not computed in the remainder class defined by modulus N, but in the remainder class defined by the transformed modulus $N^T$, so that $C^T$, and not C, stands on the left side of the above equation. The concept according to the invention distinguishes itself in that, due to utilization of the transformed modulus $N^T$, the computation of the auxiliary reduction shift value $s_i$, which corresponds to the iteration loop of FIG. 10 of the known reduction look-ahead process, is highly simplified.

In a final step 14, a re-transformation of $N^T$ into N is performed again, by carrying out an operation corresponding to the following equation:

$$C := C^T \bmod N.$$

In this respect, the transformed result $C^T$ that is in the remainder class of the transformed modulus $N^T$ is returned to the remainder class of modulus N preferably by a simple shift/subtraction reduction, so that C is the result of the modular exponentiation.

The transformation of modulus N into a transformed modulus $N^T$ utilizing the transformer T of step 10, is carried out such that the predetermined fraction of the transformed modulus, i.e. in the preferred embodiment, ⅔ times the transformed modulus, has a higher-order digit with a first predetermined value, which is followed by at least one low-order digit with a second predetermined value. The comparison of the intermediate result Z with ⅔ times the transformed modulus may thus be highly simplified, namely in that the uppermost digit of Z, which has the predetermined value as well, is looked for and the difference between the higher-order digit with the first predetermined value of the predetermined fraction of the transformed modulus and the uppermost digit of the intermediate result Z with the first predetermined value equals the difference $s_i$.

In summary, this can be represented as follows. N is transformed into a transformed modulus $N^T$ preferably in the 32 bit CPU and not in the crypto coprocessor, so that the following holds:

$$N^T := T \times N,$$

wherein T is a natural number.

The following form results for $N^T$, if all numbers used are binary numbers:

$$N^T = 1100\ldots 0\, XX\ldots XX$$

For ⅔ times the transformed modulus, the following value then results:

$$\tfrac{2}{3} N^T = 100 \ldots 0\, X'X' \ldots X'X'$$

It can be seen from $N^T$ and ⅔ $N^T$ that both have a first share of e.g. 16 bits and then a share of L(N) bits X and X', respectively. For the so-called ZDN comparison, only the uppermost 16 bits of ⅔ times the transformed modulus $N^T$ are utilized, since this already yields an error probability of better than approx. $2^{-10}$. Thus, it is not necessary to use all 512, 1024 or 2048 bits of ⅔ times the transformed modulus for the ZDN comparison, but rather it is sufficient to perform this comparison with the uppermost 16 bits of the transformed modulus. Of course, it would be possible as well to use still fewer bits of ⅔ $N^T$ for the comparison, but then the error probability increases gradually. However, as the errors are non-critical and result in sub-optimum behavior of the reduction look-ahead process only, this approach indeed is easily feasible.

Figure 9:
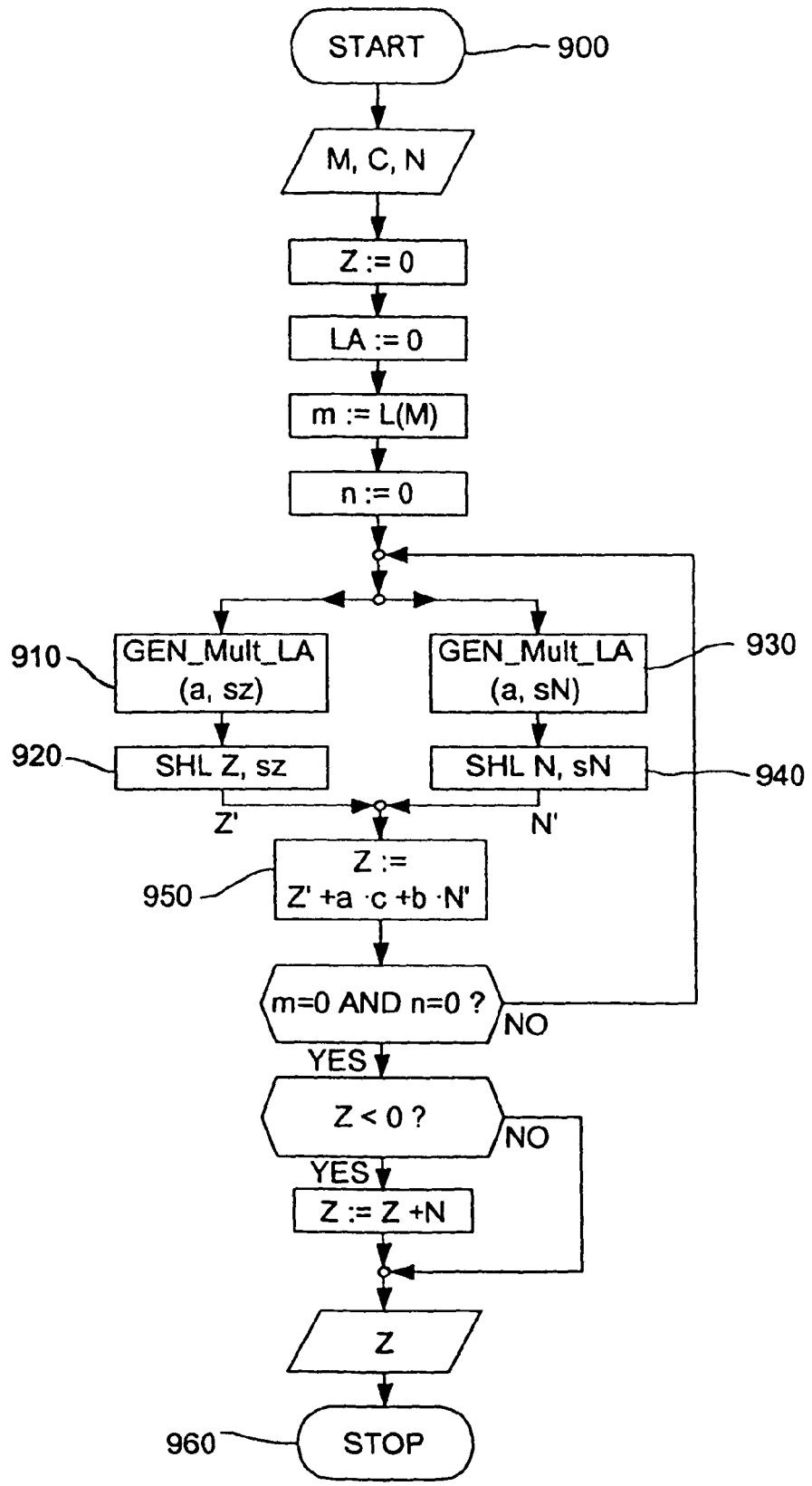
FIG. 9 shows a flow chart representation of the known ZDN method.

⅔ times the transformed modulus $N^T$ thus has a higher-order digit with the value 1, which is followed by at least one low-order digit with a value 0 and thus a second predetermined value. In the embodiment described hereinbefore, the number of the low-order digits is 15. It is of course possible here too to make use of higher or lesser numbers, depending on what dimensional differences are to be expected or handled between the intermediate result Z and ⅔ times the transformed modulus $N^T$. For the value of the intermediate result Z of the modular multiplication, i.e. the result of the three-operand addition in block 950 in FIG. 9, the following form results:

$$|Z| = 00 \ldots 01 YY \ldots Y$$

The auxiliary shift value $s_i$ is computed according to the following equation:

$$\tfrac{2}{3} N^T \times 2^{-s_i} < |Z| \leq \tfrac{4}{3} N^T \times 2^{-s_i}.$$

On the basis of the topology of ⅔ times the transformed modulus $N^T$, the value $s_i$ always is the distance between the most significant bit with a 1 of ⅔ times the transformed modulus $N^T$ and the most significant 1 of the value of the intermediate result.

According to the invention, this difference in digits or the value $s_i$ can be determined in trivial manner. An iteration is no longer required.

In addition thereto, a ZDN register is no longer necessary for storing ⅔ times the modulus since, per definition, at least the upper e.g. 16 bits of ⅔ times the transformed modulus $N^T$ always have the same form. A bit comparator is not necessary any more. The difference in significance between the highest-order digit of ⅔ times the transformed modulus $N^T$ with a "1" and the highest-order digit of Z with a "1" can easily be established, for example, by a bitwise XOR operation of the register for the transformed modulus and the register for the intermediate result Z. $s_i$ then is equal to the difference in significance of the digit where the XOR operation outputs a first "1" and where the XOR operation outputs a second "1".

Due to the fact that no ZDN register and no ZDN comparator are necessary, the overall arithmetic-logic unit can be accommodated on lesser chip area.

Figure 10:
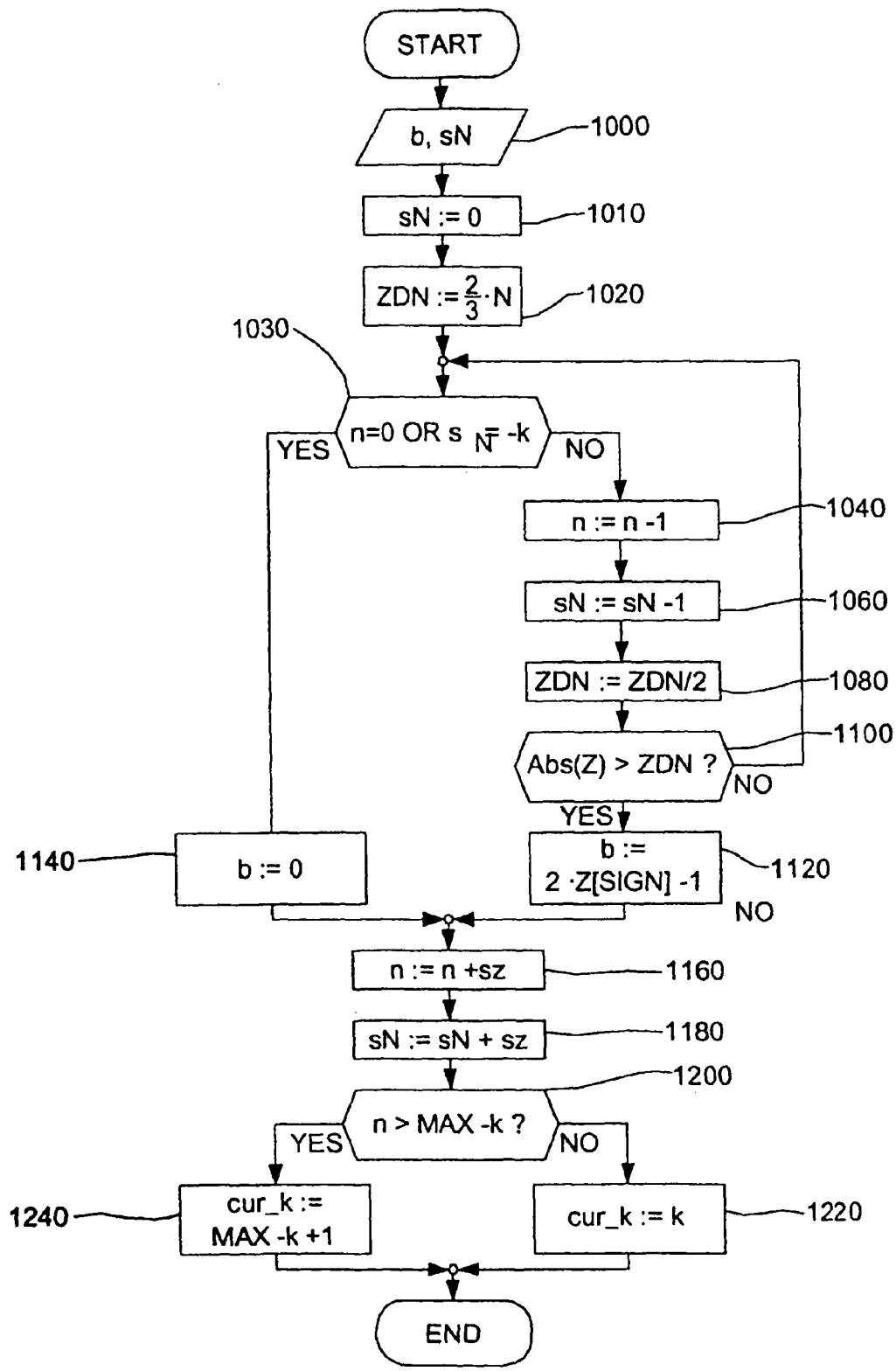
FIG. 10 shows a flow chart representation of the known reduction look-ahead process.

In addition thereto, the crypto control part, i.e. the control logic for the ZDN comparison (760 in FIG. 7), is of lesser complexity since the complex iteration loop of FIG. 10 need not be carried out. Finally, the computation is faster so that the computation of the auxiliary shift value $s_i$ does no longer lead to timing problems for the entire algorithm.

In the following, the transformation according to the invention will be discussed in more detail by way of FIGS. 2 to 5.

As has already been pointed out, a substantial part of the ZDN algorithm consists in that the following equation is fulfilled:

$$\tfrac{2}{3} 2^{-s_i} N < |Z| \leq \tfrac{4}{3} 2^{-s_i} N.$$

$s_i$ is referred to as auxiliary shift value and is the shift value that is necessary for shifting Z, in terms of digits, to the same position as N. In the prior art, the computation of $s_i$ required comparison operations of |Z| with ⅔ N.

According to the invention, the comparison with ⅔ is simplified by transforming the modulus N into the transformed modulus $N^T$, with the transformed modulus $N^T$ being greater than N, before any modular operation is carried out with N. All computations modulo $N^T$ are carried out thereafter. However, since the result of the computation has to be in the remainder class N, a final reduction with N is carried out according to the invention.

As illustrated in FIG. 2, N is assumed to be an integer with a length of N bits. Due to the fact that modulus N always is a positive integer, i.e. MSB=0 in two's complement representation, the sign bit equals 0 and the second-most-significant bit (MSB-1) of modulus N always is 1. It is not necessary for the ZDN comparison to compare all bits of the modulus to all bits of the intermediate result, but rather it is sufficient to use a number of m bits for the ZDN comparison. The most significant m bits of the modulus N define a first part of modulus $N_T$, whereas the remaining N-m bits of the modulus define a second part $N_R$ of the modulus. In a preferred embodiment, m is 16. Higher or lower values of m, of course, are possible as well.

As can be seen in FIG. 3, the transformation is carried out such that the transformed modulus $N^T$ is 16 bits longer than the original modulus of FIG. 2.

It is sufficient for the ZDN comparison to utilize the first 16 bits of $N^T$, with a preferred embodiment of the present invention making use of only 12 bits for the comparison, while the 4 least significant bits constitute a buffer for possible carries that may come from still less significant bits.

In that event, the probability of the comparison yielding a wrong result is less than $2^{-12}$. If the comparison yields a wrong result, there is just produced a sub-optimum reduction shift value $S_N$, however, the result modulo N remains correct.

If the modulus is utilized in two's complement representation as in FIG. 2, modulus N can be broken down as follows:

$$N = 2^{n-m} N_T + N_R.$$

N now is transformed into $N^T$ using the transformer T, with T being an appropriately selected integer, which is necessary for reasons of congruence. $N^T$ should have the form illustrated in FIG. 3, i.e. the most significant bit (MSB) of $N^T$ must be 0, since $N^T$ should be a positive integer. As elucidated hereinafter, the second-most significant bit and the third-most-significant bit of the transformed modulus must be 1, whereas all other bits of the uppermost section of the transformed modulus $N^T$, which section bears reference numeral 33 in FIG. 3, should have a value of "0". For, in this case only is the result for ⅔ times $N^T$ that the uppermost section of ⅔ times $N^T$, as shown in FIG. 4, has only one bit with a "1", whereas all other bits in this uppermost section 44 are "0" so that the already described trivial comparison for determining $s_i$ can be carried out.

However, the computation of the transformed modulus $N^T$ using the transformer T shall be discussed first with reference to FIG. 3. The following definition is to be assumed:

$$N^T = TN$$
$$= T(2^{n-m}N_T + N_R)$$

The following holds for transformer T:

$$T = \left| \frac{2^{p-2} + 2^{p-3}}{N_T} \right|$$

Using equation 17, the following results for the transformed modulus $N^T$:

$$N^T = \left| \frac{2^{p-2} + 2^{p-3}}{N_T} \right| (2^{n-m}N_T + N_R)$$

$$N^T = (2^{n+p-m-2} + 2^{n+p-m-3})\frac{N_T}{N_T} + (2^{p-2} + 2^{p-3})\frac{N_R}{N_T}.$$

If, for example typical values are taken for p and m, i.e. when p equals 32 bits and m equals 16 bits, the following results for $N^T$:

$$N^T = 2^{n+14} + 2^{n+13} + N_R \frac{2^{p-2} + 2^{p-3}}{N_T}.$$

It is to be pointed out that the computation of $N^T$ is preferably carried out in the host CPU and not in the crypto coprocessor. The host CPU comprises a short-number arithmetic-logic unit, which however is sufficient for computing $N^T$. Due to the fact that T has to be an integer and the computations are carried out within the crypto coprocessor modulo $N^T$ instead of modulo N, with $N^T$ being greater than N, only the first p-m equal 16 bits of $N^T$ are relevant for the trivial ZDN comparison in order to compute the auxiliary shift value $s_i$. The other n bits of $N^T$ may be any number, they are not relevant for the computation of the auxiliary shift value $s_i$, i.e. for the comparison with Z. However, all bits of the transformed modulus $N^T$, of course, are necessary for the three-operand addition which now, instead of using the shifted modulus, is carried out using the shifted transformed modulus.

As shown in FIG. 17, the transformer T is a 16 bit integer for the values chosen for m and p. The division necessary for computing T and for computing $N^T$, respectively, thus has to be carried out for the most significant 32 bits only and thus can be programmed rapidly and easily on the host CPU.

FIG. 4 shows ⅔ times the transformed modulus $N^T$. As the MSB-1 and MSB-2 of $N^T$ are "1", as shown in FIG. 3, and since the following holds:

$$(11)_2 = (3)_{10} \text{ and } (⅔ \times 3)_2 = (2)_{10} = (10)_2,$$

a simple bit pattern results for ⅔ times the transformed modulus $N^T$, with the length of ⅔ times the transformed modulus $N^T$ being n−m+p.

Due to the special form of ⅔ $N^T$, the comparison with |Z| now becomes very simple. It is known that the highest-order one of ⅔ $N^T$ is at a position n+p−m−2 at the beginning of a modular operation. A pointer for the register Z in a preferred embodiment then starts at the MSM of Z and looks for the first "1" of Z. If the MSB of Z is 1, Z will be a negative number and, instead, the first zero of Z will be looked for.

The difference of the bit position of the first one in register N and in register Z determines the auxiliary shift value $s_i$.

Due to the fact that the result of the modulo operation has to be in the remainder class N, a final reduction modulo N is carried out according to the invention, which means that a re-transformation has to be carried out (step 14 in FIG. 1).x The transformation of N into $N^T$ has the following advantages as compared to the known ZDN comparison:

Instead of computing ⅔ N within the crypto coprocessor, a simple transformation of N into $N^T$ can be carried out in the host CPU.

There is no ZDN register and no comparator logic necessary on the chip, so that the chip size is reduced and the complexity of the coprocessor decreases.

Finally, the transformation of N into $N^T$ may be combined with randomization of modulus N as illustrated by way of FIG. 5. When R is a random number having a length of s bits, the randomized transformed modulus $N^T$ has the form shown in FIG. 5. Due to the randomization number N, the randomized transformed modulus, as compared to the case in which no randomization has been carried out (FIG. 3), becomes longer by s bits, i.e. by the number of digits of R.

In the form of an equation, this may be expressed as follows:

$$N^T = TN$$
$$= T(2^{n-m}N_T + N_R)$$

The randomized transformer T then is as follows:

$$T = \left| \frac{2^{p-2} + 2^{p-3} + R}{N_T} \right|$$

Thus, the following expression results for the randomized transformed modulus:

$$N^T = \left| \frac{2^{p-2} + 2^{p-3} + R}{N_T} \right| (2^{n-m}N_T + N_R)$$

$$N^T = (2^{n+p-m-2} + 2^{n+p-m-3} + R2^{n-m})\frac{N_T}{N_T} + (2^{p-2} + 2^{p-3} + R)\frac{N_R}{N_T}.$$

When selecting p to have 144 bits, m to have 16 bits and s to have 112 bits, the following value results for the transformed modulus $N^T$ including randomization:

$$N^T = 2^{n+126} + 2^{n+125} + R2^{n-16} + N_R \frac{2^{144} + 2^{143} + R}{N_T}.$$

The bith length of $N^T$ then is:

$L(N^T) = n+p-m = n+m+s = n+16+112 = n+128$ bits

Figure 7:
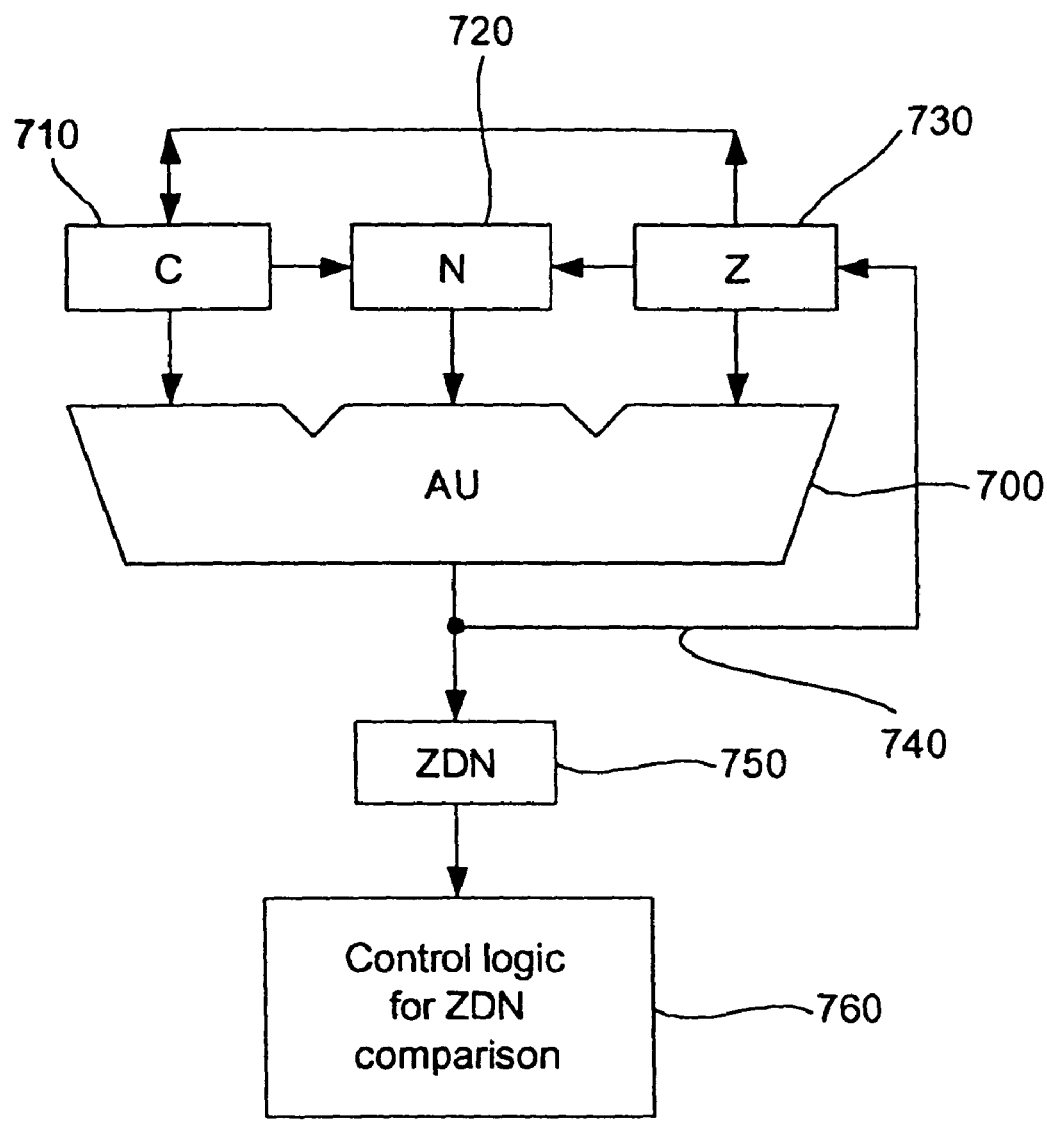
FIG. 7 shows a schematic representation of an arithmetic-logic unit for the known ZDN method.

FIG. 6 illustrates an arithmetic-logic unit according to the invention which, as compared to FIG. 7, no longer has a ZDN register, but merely an arithmetic unit 700, a C register 710, an N register 720 and a Z register 730, with the N register 720 no longer storing the modulus or a shifted modulus, but the transformed modulus or a shifted transformed modulus, or a randomized transformed modulus or a shifted randomized transformed modulus.

Figure 8A:
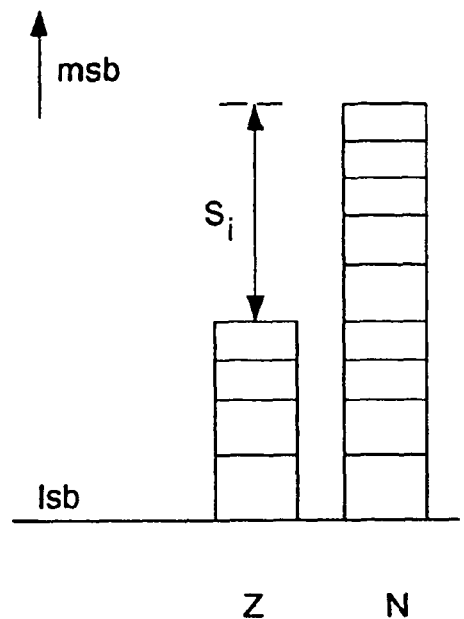
FIGS. 8a to 8c show a schematic representation of the relationship between multiplication shift value $s_z$, auxiliary shift value $s_i$ and reduction shift value $S_N$.

In the following, FIGS. 8a to 8c shall be dealt with in order to illustrate the relationship between the auxiliary shift value $s_i$ and the reduction shift value $S_N$.

In the following, FIGS. 8a to 8c shall be dealt with in order to illustrate the computation of the reduction shift value $s_z$ using the auxiliary reduction shift value $s_i$. FIG. 8a shows an intermediate result Z and a modulus N. Merely by way of example, the intermediate result has 4 bits, while the modulus has 9 bits. It is to be assumed now that the block 214 of FIG. 2 computes a shifted intermediate result Z', which can be achieved by multiplication by $s_z$. Assuming that the multiplier had 8 zeroes, the result hereof is that the multiplication shift value $s_z$ is 8. To obtain a modular reduction, the modulus N must be brought to the order of magnitude of the shifted intermediate result Z'. According to the invention, the modulus N is to be shifted to such an extent that the uppermost bit of the shifted intermediate result polynom Z' and the uppermost bit of the shifted modulus N are equal. As can be seen from FIG. 8b, a reduction shift value $S_N$ of 3 is required in this respect.

Figure 8B:
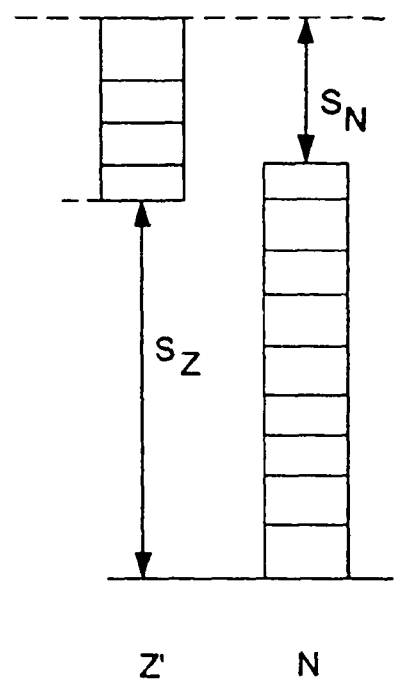
Figure 8C:
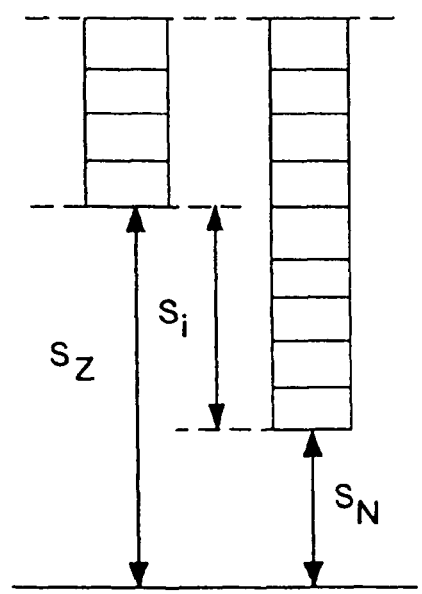

It can also be seen from FIG. 8b that the determination of $S_N$ actually can be carried out only after $s_z$ has been computed, i.e. that parallel implementation of blocks 210 and 212 of FIG. 2, as is preferred for the present invention, is not possible. For this reason, the auxiliary shift parameter $s_i$ is introduced. The advantageous aspect of $s_i$ is that this value can be computed without the $s_z$ of the current step being known.

It can be seen from FIG. 8b that $s_z$ at all time is equal to the sum of $s_i$ and $S_N$. $S_N$ thus is always correlated with $s_z$ and $s_i$ such that the following equation holds:

$S_N = S_Z - S_i.$

The time-consuming iterative process for determining $S_N$ thus can be broken down into a time-consuming iterative process for determining $s_i$ (loop 416) and a fast difference operation (block 422 of FIG. 4). Thus, nearly parallel implementation of the two look-ahead processes is possible, with the sole serial component consisting in that, prior to computing block 422 (FIG. 4), the actual value of $s_z$ has already been computed and delivered by the multiplication look-ahead algorithm (arrow 230 in FIG. 2).

It is to be summarized that the present invention simplifies the comparison between ⅔ N and the value of Z as compared to the known ZDN method. In contrast to the method known so far, in which the uppermost 32 bits of ⅔ N were computed in the crypto coprocessor and deposited in a separate 32 bit register, the ZDN register, with the comparison of ⅔ N with the value of Z having been carried out according to the known ZDN method in hardware via a comparator that was constituent part of the control part of the crypto coprocessor, the method now proceeds as follows. The modulus N is transformed by the host CPU into a transformed modulus $N^T$ that is greater than N, with the first bits of $N^T$ being a constant that is selected such that the comparison of ⅔ $N^T$ with the value of Z is trivial. For improving security against information leakage attacks, such as SPA, DPA, timing attacks, the transformation of N into $N^T$ may be combined with the randomization of the modulus, as has been illustrated.

The ⅔ N computation in the crypto coprocessor is thus dispensed with. The ZDN register and the comparator logic are omitted as well, thus providing for smaller chip area and reduction of the complexity of the control part in the crypto coprocessor by omission of the comparator logic.

We claim:

1. A method for securing data storage and transmission, the method comprising:

converting the data using a cryptographic algorithm, the cryptographic algorithm including a modular multiplication of a multiplicand by a multiplier, in which a modulus is employed, wherein the multiplicand, the multiplier, and the modulus are parameters in the cryptographic algorithm, the cryptographic algorithm using a multiplication look-ahead process and a reduction look-ahead process; and performing the cryptographic algorithm by:

transforming the modulus into a transformed modulus being greater than the modulus by multiplying the modulus by a transforming number, the transforming number being calculated using the modulus such that a predetermined fraction of the transformed modulus has a higher-order digit with a first predetermined value followed by at least one lower-order digit having a second predetermined value;

iteratively working off the modular multiplication using the multiplication look-ahead process and the reduction look-ahead process and utilizing the transformed modulus so as to obtain at the end of the iteration a transformed result for the modular multiplication, the predetermined fraction of the transformed modulus being used in the reduction look-ahead process; and re-transforming the transformed result by modular reduction of the transformed result utilizing the modulus, wherein the method is performed by an arithmetic-logic unit comprising an arithmetic unit and a register for storing the transformed modulus, a Z register for storing the transformed result, and a C register for storing the multiplicand.

2. The method according to claim 1, wherein iteratively working off comprises a plurality of iteration steps, with a multiplication intermediate result and a reduction shift value being determined in one of the iteration steps, with the reduction shift value being computed using a determination of the number of digits between the higher-order digit with the first predetermined value of the transformed modulus and the highest-order digit of the intermediate result having the first predetermined value.

3. The method according to claim 2, which further comprises determining a multiplication shift value in the multiplication look-ahead process, and calculating the reduction shift value for the reduction look-ahead process by subtraction of the predetermined number of digits from the multiplication shift value.

4. The method according claim 1, wherein iteratively working off comprises:

in a first iteration step:
- (a) performing the multiplication look-ahead process to obtain a multiplication shift value;
- (b) multiplying a base raised to the power of the multiplication shift value by a current intermediate result to obtain a shifted intermediate result;
- (c) performing the reduction look-ahead process to obtain a reduction shift value by determining an auxiliary shift value equal to the number of digits between the higher-order digit with the first predetermined value of the predetermined fraction of the transformed modulus and the highest-order digit of the intermediate result having the first predetermined value, and by calculating the reduction shift value using the auxiliary shift value and the multiplication shift value;
- (d) multiplying the transformed modulus by the base raised to the power of the reduction shift value to obtain a shifted transformed modulus; and
- (e) summing the intermediate result and the multiplicand and subtracting the shifted transformed modulus to obtain an updated intermediate result.

5. The method according to claim 1, wherein said predetermined fraction of the modulus is $2/3$.

6. The method according to claim 5, wherein the multiplicand, the multiplier and the modulus are binary, with the base being 2, and the higher-order digit of the predetermined fraction of the transformed modulus has the first predetermined value of 1 and the at least one low-order digit has the second predetermined value of 0.

7. The method according to claim 6, wherein the most significant bit of the transformed modulus is a sign bit, and a higher-order section of the predetermined fraction of the modulus reads as follows:

01000 xx . . . xx, in which the bits designated xx may have arbitrary values.

8. The method according to claim 7, wherein the higher-order section of the transformed modulus reads as follows:

01100 . . . 00.

9. The method according to claim 1, wherein transforming the modulus comprises randomization of the modulus so that the transformed modulus is randomized.

\* \* \* \* \*